July 16, 1935.  C. W. BRYNAN  2,008,636
BRUSHLESS SHAVING CREAM SPREADER CAP FOR COLLAPSIBLE TUBES
Filed Nov. 28, 1933
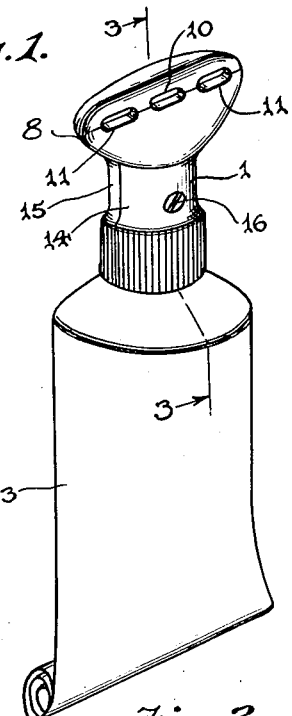
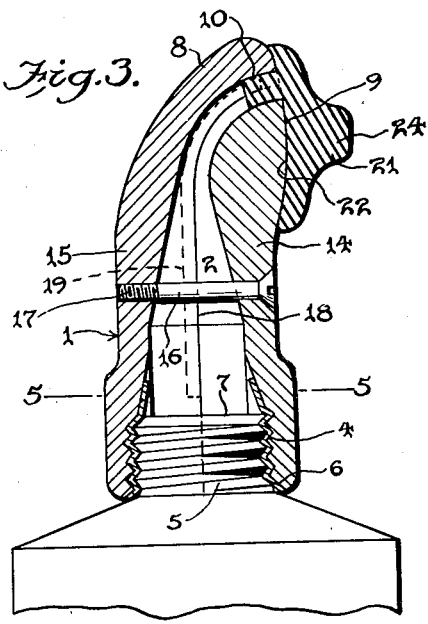
Inventor
Charles W. Brynan,
By
Attorney Patented July 16, 1935

2,008,636

UNITED STATES PATENT OFFICE 2,008,636

BRUSHLESS SHAVING CREAM SPREADER CAP FOR COLLAPSIBLE TUBES

Charles W. Brynan, Philadelphia, Pa.

Application November 28, 1933, Serial No. 700,125

18 Claims. (Cl. 91—67.4)

The invention relates to a brushless shaving cream spreader cap for collapsible tubes.

The object of the present invention is to provide a simple, practical and efficient spreading device of strong, durable and comparatively inexpensive construction, adapted for spreading shaving cream and various other preparations contained in collapsible tubes, and capable of being readily applied to a collapsible tube and of closing communication with the same after use so as to prevent any liability of the material contained within the tube drying out or deteriorating from exposure.

A further object of the invention is to provide a spreading device of this character capable of enabling any type or brand of brushless shaving cream or similar preparations contained in the collapsible tube to be spread on the face of a person or other portion of the body untouched by the hand, in a cleaner, more sanitary, faster, and more economical manner than heretofore. It is also an object of the present invention to enable shaving cream or other similar preparations to be spread more evenly and uniformly than is possible with the fingers, and at the same time obviate the loss of time, waste of material and inconvenience of removing cream from the fingers after applying the cream to the face and before shaving.

A further object of the invention is to provide a cream spreading device adapted to spread shaving cream with a longer stroke and over a greater area than is possible when applying the shaving cream with the fingers and of feeding the cream at a plurality of outlets in the spreading face in a manner to discharge the shaving cream more freely centrally of the spreading surface and less freely at the side portions thereof so that the shaving cream will be retained on the area controlled by the spreader and not forced off the sides thereof.

With these and other objects in view the invention consists in the construction and novel combination and arrangement of parts hereinafter fully described, illustrated in the accompanying drawing and pointed out in the claims hereto appended, it being understood that various changes in the form, proportion and minor details of construction, within the scope of the claims, may be resorted to without departing from the spirit or sacrificing any of the advantages of the invention.

In the drawing:—

Figure 1 is a perspective view of a brushless shaving cream spreader cap constructed in accordance with this invention and shown applied to a collapsible tube.

Fig. 2 is an elevation of the spreading device partly in section.

Fig. 3 is a longitudinal sectional view of the spreading device on the line 3—3 of Fig. 1.

Fig. 4 is a detail view of the closure member.

Fig. 5 is a transverse sectional view on the line 5—5 of Fig. 3.

Fig. 6 is a longitudinal sectional view of a spreading device illustrating another form of the invention.

In the accompanying drawing in which is illustrated the preferred forms of the invention, 1 designates a spreading device consisting of a hollow tubular body having a longitudinal passage 2 and adapted to extend longitudinally from a collapsible tube 3, as clearly illustrated in Figs. 1 and 3 of the drawing. The spreading device may be made of any suitable material, such as rubber, soft or hard, bakelite or any other plastic material, adapted to be molded to form the spreading device. Also the spreading device may be constructed of light weight metal, such as aluminum, and be stamped or otherwise formed therefrom. The major portion of the body 1 is preferably round, as shown, and it is interiorly threaded at the inner end at 4 to screw on the threaded neck 5 of the collapsible tube 3, but the spreading device may be secured to a tube in any other desired manner. The interior of the body at the lower end of the passage is preferably beveled or chamfered to provide a flaring portion 6 to facilitate the placing of the spreader on the threaded neck 5 of a collapsible tube and engagement of the threads of the spreader with the threads of the tube. A shoulder 7 is formed at the inner end of the threaded portion 4 of the tube to form a stop for the spreader, as clearly shown in Fig. 3 of the drawing.

The outer portion of the spreading device is laterally enlarged to form a downwardly tapered head 8 which merges at the lower portion into the neck or intermediate portion of the spreading device. The tapered head 8 is provided with a slightly bulging, slightly longtudinally convex spreading surface 9 of approximately segmental form, as clearly illustrated in Fig. 2 of the drawing. The spreading device is provided at the central and side portions of the spreading surface 9 with central and side outlet openings 10 and 11 for permitting the shaving cream or other preparation to flow from the passage 2 to the exterior of the spreading device at the spreading surface 9 thereof to enable the shaving cream or other preparation to be spread over the face of a person or other portion of the body without the hands coming in contact with the shaving cream or other material contained in a collapsible tube.

The openings are preferably substantially oblong, but any other suitable form of opening may, of course, be employed, and the number of the outlet openings may be varied. The passage 2 which in practice will have the same cross sectional area as the opening in the threaded neck 5 of the collapsible tube tapers longitudinally as shown in Fig. 3 and also laterally as illustrated in Fig. 2 of the drawing, and the spreader is provided between the openings with webs 12 oppositely beveled at their inner portions at 13 to provide tapered edges. The webs 12 which reinforce the spreader and form separate branch passages at the outlet openings also enhance the appearance of the spreader when the same is made in sections, as hereinafter explained. The webs by forming the separate branch passages cooperate with the walls of the passage to retard the shaving cream passing through the side openings 11 without interfering with the freer passage of the shaving cream through the central outlet opening. This enables the shaving cream to flow more freely through the central outlet opening and less freely through the side outlet openings so that the cream will be retained on the spreading surface or within the area of the spreading surface and not be forced off the spreading surface at the side edges thereof. This will enable the spreading of the cream to be controlled.

The spreading device enables shaving cream to be spread over the face directly from the tube without the fingers coming in contact with the shaving cream. The device is adapted to be operated with a stroke substantially similar to that of an ordinary safety razor and the shaving cream may be spread more rapidly and evenly over the face than is possible with the fingers as the device has a longer stroke and will cover more surface in a stroke than the fingers.

Also the waste incident to the spreading of shaving cream on the face by the fingers and the inconvenience thereof and the loss of time in washing the hands to remove the cream from the fingers before shaving are eliminated and the operation of shaving is rendered more rapid and satisfactory.

The spreading device may be molded in a single piece as illustrated in Fig. 6 of the drawing or made in separate sections, as illustrated in Figs. 1 to 3 inclusive. When the device is constructed in two sections 14 and 15 it is divided longitudinally of the passage which curves toward the outlet openings, and the sections are connected by a transverse fastening device 16 which is preferably in the form of a screw having its head countersunk in one of the sections and its other end 17 threaded into the other section. This will enable the sections to be readily separated for convenient cleaning of the interior of the device when desired.

The spreading device is preferably divided longitudinally and centrally of the passage 2 in the formation of the front and rear sections 14 and 15. The sections are provided at their abutting edges 18 with an interlocking joint preferably formed by a tongue 19 and a groove 20. The interlocking joint cooperates with the screw 16 in holding the sections 14 and 15 of the spreading device firmly together. The tongue and groove joints between the meeting edges of the sections 14 and 15 prevent relative lateral movement of the sections and the said tongues and grooves preferably extend from the enlarged interiorly threaded lower end portion of the spreading device to within a short distance of the upper end of the front section 14, as indicated in dotted lines in Fig. 2 of the drawing.

Instead of employing the tongues 19 and the grooves 20, any other preferred form of interlocking joint or connection for the meeting edges of the sections 14 and 15 of the spreading device may be provided.

The outer face 20 of the rear section 15 of the spreading device is convex longitudinally of the spreading device and the end surface of the spreading device at the top thereof is rounded from front to rear so as to present a top convex surface which merges into the front convex spreading surface, as clearly illustrated in Fig. 3 of the drawing.

The spreading device is equipped with a closure member 21 of substantially segmental form having an inner concave closure face 22 of substantially the same area as the spreading surface 9 and fitting the same. The closure member is provided at its inner concave face with projecting oblong closure lugs 23 having rounded end edges and adapted to fit in the central and side oblong openings 10 and 11 to form an air-tight cover or closure for the spreading device when the same is not in use. The closure member which fits and covers the convex spreading surface of the spreading device protects the same from dust and the said closure device may be made of any suitable material, such as rubber or metal or plastic material. When the spreading device is made of hard material the closure member will be preferably made of relatively soft material, such as soft rubber, and when the spreading device is made of soft material the closure member will be made of relatively hard material so that with either construction an air-tight closure may be provided for the outlet openings of the spreading device.

The closure member is provided at its outer face with an outwardly extending tapered transverse enlargement 24 forming a grip extending substantially across the closure member and adapted to enable the closure member to be readily grasped between the thumb and fingers. This will enable the closure members to be readily handled in placing it in and removing it from its outlet closing position. The lugs 23 which form stoppers for the outlet openings retain the closure member in position on the spreading device.

In Fig. 6 of the drawing the spreading device is formed of a single piece of material and is preferably molded of any suitable plastic material and when constructed of rubber or other soft material it is equipped with a threaded sleeve 26 arranged within the lower end of the passage 2, as clearly illustrated in Fig. 6 of the drawing. The threaded sleeve which directly engages the threads of a collapsible tube when the spreading device is applied to the same is interlocked with the body portion of the spreading device to prevent relative rotary movement. To effect this interlocking connection between the threaded sleeve and the body portion of the spreading device the sleeve is preferably provided at the top with integral prongs 27 preferably arranged diametrically opposite each other and adapted to be bent into tapering recesses 28 whereby the threaded sleeve will be held against rotary movement within the passage 2 when the spreading device is screwed on or off a collapsible tube. The number and position of the prongs may, of course, be varied, and any other suitable means for interlocking the threaded sleeve with the body portion of the spreading device may be substituted for the prongs.

The threaded sleeve is preferably constructed of metal, but any other suitable material may, of course, be employed in the construction of the threaded sleeve. In order to enable the spreading device to be readily placed on the threaded neck of a collapsible tube and engaged with the threads thereof the sleeve is provided at its lower end beyond the screw threads with a flaring portion 29. The stiff metal sleeve reinforces the soft rubber spreading device and enables the same to be firmly applied to a collapsible tube. Also when the spreading device is made in two sections as illustrated in Figs. 1 to 4 inclusive of the drawing and when the spreading device is made of a single piece of any material which it is desired to reinforce, the threaded sleeve 26 of metal or other suitable material may be employed. The threaded sleeve 26 shown in Fig. 3 of the drawing is constructed the same as the sleeve 26 illustrated in Fig. 6 and is provided at the top with prongs 27 which engage recesses 28 in the front and rear sections 14 and 15. The threaded sleeve takes the thrust of the threads and relieves the fastening means for securing the sections together of the strain incident to screwing the spreading device on or off a collapsible tube.

The inner or lower end 29 which is preferably interiorly threaded to receive the threaded sleeve is slightly enlarged and is knurled to provide a grip to enable the spreading device to be readily screwed on and off the neck of a flexible tube. The threaded sleeve which is preferably stamped or otherwise formed of thin metal provides both interior and exterior threads, the interior threads cooperating with the threaded neck of the collapsible tube and the outer threads engaging the threads of the body portion of the spreading device.

What is claimed is:

1. A spreading device for material contained in collapsible tubes comprising a body having a longitudinal passage and adapted to extend from one end of the tube with its passage communicating with the interior of the same, said body being laterally enlarged at the outer end and forming a tapering head having a spreading surface provided with a plurality of outlet openings, the outer portion of the longitudinal passage being flared, and webs arranged within the head and located between the outlet openings and extending inwardly and forming branch passages communicating with the outlet openings, the inner edges of the webs being beveled for dividing the contents of the tube and the said webs cooperating with the walls of the tube to retard the passage of the contents through certain of the openings and to permit a freer passage of the contents through another opening.

2. A spreading device for material contained in collapsible tubes comprising a hollow body forming a longitudinal extension of a collapsible tube when applied thereto and having a longitudinal passage enlarged at the inner end and interiorly threaded to screw on the threaded neck of a collapsible tube, the other end of the body being enlarged to form a head having a side spreading surface and provided with lateral outlet openings located at spaced points within the area of the side spreading surface, the said longitudinal passage being curved and flared at the outer portion and communicating with each of the lateral outlet openings and tapered longitudinally and the cross sectional area of the passage being of substantially the cross sectional area as the opening in the neck of the collapsible tube.

3. A spreading device for material contained in collapsible tubes comprising a body portion having a longitudinal passage for the material of the tube and provided at the outer portion with a spreading surface and having an outlet therein communicating with the said passage, said body portion being divided into two sections having abutting edges provided with coacting interlocking portions to prevent relative lateral movement of the sections, and fastening means for securing the sections in their interlocking engagement.

4. A spreading device for material in collapsible tubes comprising a body portion having a longitudinal passage and provided at one end with a spreading surface having an outlet communicating with the passage, a threaded sleeve arranged within the passage at the inner end of the spreading device and adapted to engage the threads of a collapsible tube, and coacting means on the sleeve and the body portion of the spreading device for interlocking the sleeve with the said body portion to prevent relative rotary movement of the sleeve and the spreading device when the latter is screwed on or off a collapsible tube.

5. A spreading device for material in collapsible tubes comprising a body portion having a longitudinal passage and provided at one end with a spreading surface having an outlet communicating with the passage, said body portion being provided within the said passage with a recess located adjacent the inner end of the said body portion, and a sleeve arranged within the said passage and provided with a prong engaging the said recess to prevent relative rotary movement of the sleeve and the spreading device when the latter is screwed on or off a collapsible tube.

6. A spreading device for material in collapsible tubes comprising a body portion having a longitudinal passage and provided at one end with a spreading surface having an outlet communicating with the passage, said body portion being provided within the said passage with a recess located adjacent the inner end of the said body portion, and a sleeve arranged within the said passage and provided with a prong engaging the said recess to prevent relative rotary movement of the sleeve and the spreading device when the latter is screwed on or off a collapsible tube, said sleeve being provided at the lower end with a flared extension arranged to guide the threaded neck of the collapsible tube into engagement with the threads of the sleeve.

7. A spreading device for material contained in collapsible tubes comprising a rigid body forming a longitudinal extension of a collapsible tube when applied thereto and having a longitudinal passage and designed to be connected at one end with a collapsible tube and provided at the other end with a side spreading surface having a lateral outlet opening located within the area of the side spreading surface, and a removable closure member fitting against and covering and protecting the spreading surface and having a lug extending into the lateral outlet opening and retaining the said member in its protecting position on the side spreading surface.

8. A spreading device for material contained in collapsible tubes comprising a body forming a longitudinal extension of a collapsible tube when applied thereto and having a longitudinal passage and designed to be connected at one end with a collapsible tube and provided at the other end with a side spreading surface having a plurality of oblong lateral outlet openings located at spaced points within the area of the side spreading surface and arranged to discharge the contents of the collapsible tube onto the spreading surface at a plurality of spaced points, and a closure member fitted against and substantially covering and protecting the side spreading surface and provided with oblong lugs fitting the outlet openings and retaining the closure member in its protecting position over the side spreading surface.

9. A spreading device for material contained in collapsible tubes comprising a rigid body portion forming a longitudinal extension of a collapsible tube when applied thereto and having a longitudinal passage and provided at the outer end with a side spreading surface having a lateral outlet opening communicating with the passage and located within the area of the side spreading surface, said spreading surface being of substantially segmental convex form, and a closure member having a stopper lug fitting the outlet opening, said closure member being of substantially segmental form and having a concave inner face fitting and substantially covering and protecting the convex side spreading surface of the spreading device, the stopper lug closing the outlet opening and also supporting and maintaining the closure member in its surface protecting position.

10. A spreading device for material contained in collapsible tubes comprising a body forming a longitudinal extension of a collapsible tube when applied thereto, said body being laterally enlarged at the outer end and forming a tapering head having a side spreading surface presenting a broad smooth convexly curved face and provided with a plurality of unobstructed outlet openings located at laterally spaced points within the area of the spreading surface, said body having a longitudinally extending passage which is flared at its outer end and communicates with each of said lateral openings whereby when the collapsible tube is compressed the material contained therein will be discharged at a plurality of points onto the convex side spreading surface.

11. A spreading device for material contained in collapsible tubes comprising a rigid body forming a longitudinal extension of a collapsible tube when applied thereto and having a longitudinal passage adapted to extend from one end of the tube and having communication with the interior of the tube, said body being laterally enlarged at the outer end and forming a tapering head having a relatively broad smooth convex side spreading surface provided with a plurality of unobstructed lateral outlet openings located at spaced points within the area of the side spreading surface, said body having a longitudinally extending curved passage therein which is flared at its outer end and which communicates with all of said lateral openings, and means contained within the flared portion of the head for forming separate branch passages within the flared portion of said passage separately communicating with the lateral outlet openings whereby the material contained within the collapsible tube may be discharged at a plurality of points onto the side spreading surface.

12. A spreading device for material contained in collapsible tubes comprising a body forming a longitudinal extension of a collapsible tube when applied thereto and at its outer end being laterally enlarged and forming a tapering head having a side spreading surface, said body having an internal passage extending from end to end thereof for communication with the interior of the tube and at its outer end being flared laterally, said side spreading surface having spaced openings leading into the flared portion of said passage, and webs arranged within the flared portion of the head and located between said openings and extending inwardly to form branch passages for said openings to communicate with said flared portion of said passage, whereby the material contained within the collapsible tube may be discharged at a plurality of points onto the side spreading surface.

13. A spreading device for material contained in collapsible tubes comprising a hollow body forming a longitudinal extension of a collapsible tube when applied thereto and having a longitudinal passage for the material of the tube and provided at the outer end with a side spreading surface having a plurality of lateral outlet openings located at spaced points within the area of the side spreading surface for the discharge of the material of the tube onto the said side spreading surface, the outer portion of the longitudinal passage being broadened laterally and curved to and communicating with the lateral outlet openings, said body being divided longitudinally of the passage to form two separate sections, separable for readily cleaning the longitudinal passage whereby the device may be maintained in a sanitary condition.

14. A spreading device of the character described for spreading shaving cream and other preparations comprising a body forming a longitudinal extension of a collapsible tube when applied thereto, said body being enlarged laterally at its outer end to form a head provided with a side spreading surface having a discharge opening therein, the body having a passage therein for communication with the interior of the tube and at its outer end being curved and extending into communication with said discharge opening of the side spreading surface whereby upon compression of the tube material may be forced therefrom through said passage and through said discharge opening onto said side spreading surface, said body being formed in sections, and means for securing the sections together, whereby the body may be readily disassembled for cleaning purposes.

15. A spreading device for material contained in collapsible tubes comprising a body portion forming a longitudinal extension of a collapsible tube when applied thereto, the outer end of the body being enlarged and having a side spreading surface of substantially segmental convex form, said body also having a longitudinally extending curved, tapering passage which at its inner end communicates with the tube and which at its outer end leads through the substantially segmental convex form of spreading surface whereby upon compression of the tube material is forced from the latter through said passage onto the substantially segmental convex form of side spreading surface.

16. A spreading device for material contained in collapsible tubes comprising a body forming a longitudinal extension of a collapsible tube when applied thereto, said body being laterally enlarged at the outer end and forming a tapering head having a side spreading surface provided with central and side outlet openings located at spaced points within the area of the side spreading surface, said body having a longitudinally extending curved passage which communicates with the interior of the tube and which at its outer end is flared within the head and separately communicates with said spaced outlet openings whereby to discharge the material from the tube through said spreading device more freely centrally of the spreading side surface and less freely at the side portions thereof so that the material will be retained on the area controlled by the spreading side surface and not forced off the sides thereof.

17. A spreading device for material contained in collapsible tubes comprising a body forming a longitudinal extension of a collapsible tube when applied thereto, said body being laterally enlarged at the outer end and forming a tapering head having a side spreading surface of substantially convex formation provided with a plurality of lateral outlet openings located at spaced points within the area of the side spreading surface, said body having a longitudinally extending curved passage which communicates with the interior of the tube and which at its outer end is flared and leads to said spaced outlet openings whereby to discharge the material from the tube through said spreading device more freely centrally of the spreading side surface and less freely at the side portions thereof so that the material will be retained on the area controlled by the spreading side surface and not forced off the sides thereof, and webs arranged within the head and located between said outlet openings and extending inwardly and forming branch passages communicating with the lateral outlet openings.

18. A spreading device for material contained in collapsible tubes, comprising a hollow body apertured at one end for attachment to a tube and having a flared spatulate head, the cavity of said body flaring from its said apertured end and substantially in conformity with the shape of the head, said head having a convexly curved spreading face, and a plurality of outlet openings through said face separately communicating with the cavity of the body, the said spreading face presenting an otherwise smooth regularly curved surface around said outlet openings.

CHARLES W. BRYNAN.